(12) United States Patent
Georges

(10) Patent No.: US 6,871,970 B2
(45) Date of Patent: Mar. 29, 2005

(54) OUTSIDE REARVIEW MIRROR FOR AN AUTOMOTIVE VEHICLE

(75) Inventor: Christian Georges, Jussarupt (FR)

(73) Assignee: Ficomirrors France SAS, Dieuze (FR)

( * ) Notice: Subject to any disclaimer, the term of this patent is extended or adjusted under 35 U.S.C. 154(b) by 1 day.

(21) Appl. No.: 10/424,098

(22) Filed: Apr. 28, 2003

(65) Prior Publication Data

US 2003/0202263 A1 Oct. 30, 2003

(30) Foreign Application Priority Data

Apr. 29, 2002 (FR) .......................................... 02 05389

(51) Int. Cl.$^7$ ................................................ G02B 5/08
(52) U.S. Cl. ...................................................... 359/841
(58) Field of Search ................................ 359/841, 871, 359/874, 877; 248/478, 479, 289.31

(56) References Cited

U.S. PATENT DOCUMENTS

| 3,390,937 A | 7/1968 | Nicholson |
| 3,421,728 A | 1/1969 | Gordon |
| 3,628,862 A | 12/1971 | Stephenson |
| 4,286,841 A | 9/1981 | Deshaw |
| 4,477,150 A | * 10/1984 | Usami et al. ............... 359/874 |
| 5,342,015 A | * 8/1994 | Burton et al. ............... 248/478 |
| 5,467,230 A | 11/1995 | Boddy et al. |
| 6,174,062 B1 | 1/2001 | Schillegger et al. |

FOREIGN PATENT DOCUMENTS

| DE | 1 266 159 | 4/1968 |
| DE | 39 30 103 | 3/1991 |
| WO | WO 02/081262 | 10/2002 |

* cited by examiner

*Primary Examiner*—Euncha P. Cherry
(74) *Attorney, Agent, or Firm*—Young & Thompson

(57) ABSTRACT

An external rearview mirror of an automotive vehicle, in particular a utility vehicle and more particularly agricultural tractors, comprises a housing (1) for supporting and receiving a rearview mirror (2), a mounting assembly (3) for the housing (1) on a door (4) or on a body element and adjustment element (5) for the housing by at least one electrical motor. The adjustment for the housing is essentially constituted by a drive (7) secured to the housing (1) and by a pair of drive motors (6) coacting with the drive (7) each directly by a drive pinion (8).

16 Claims, 5 Drawing Sheets

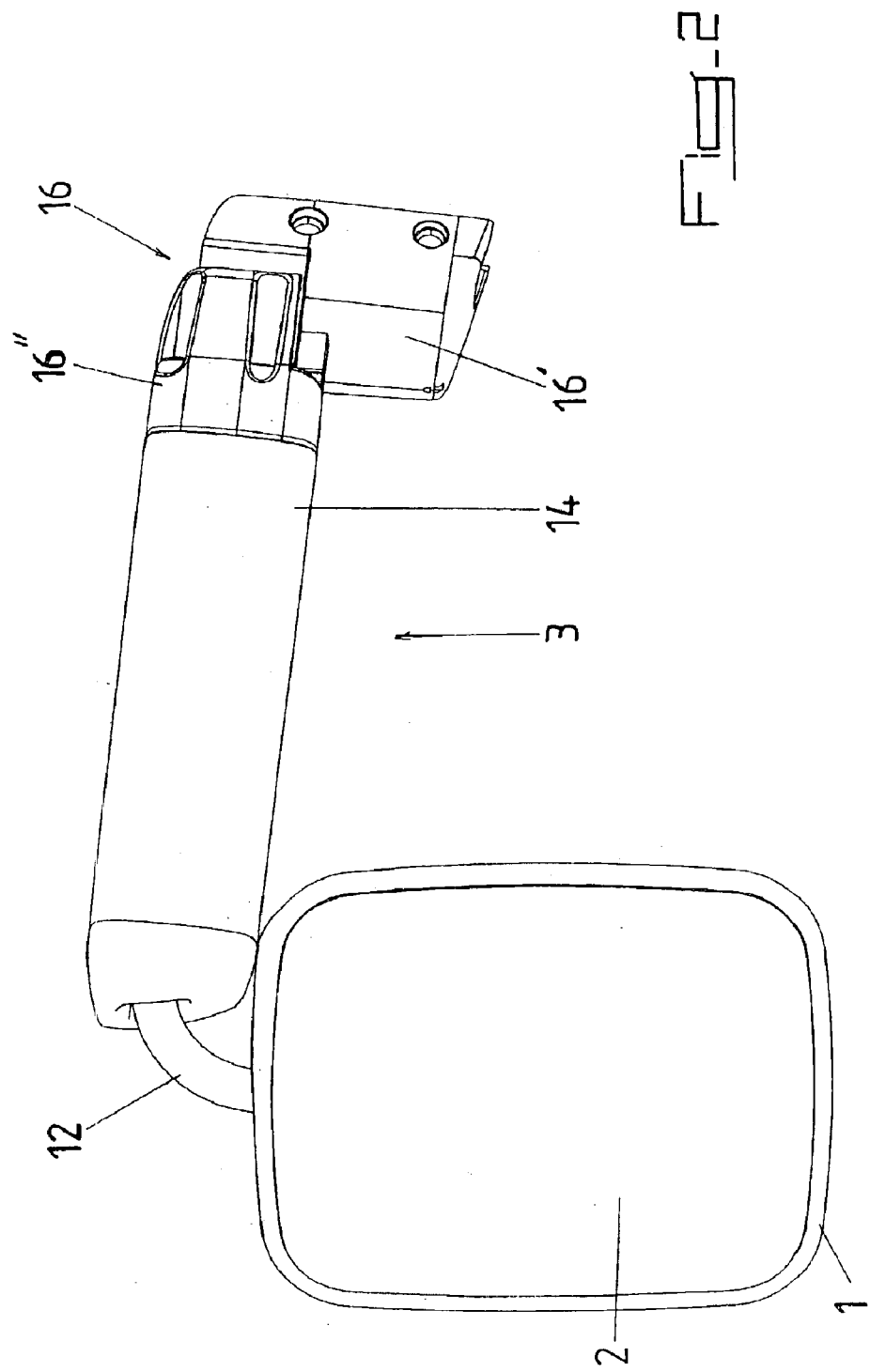

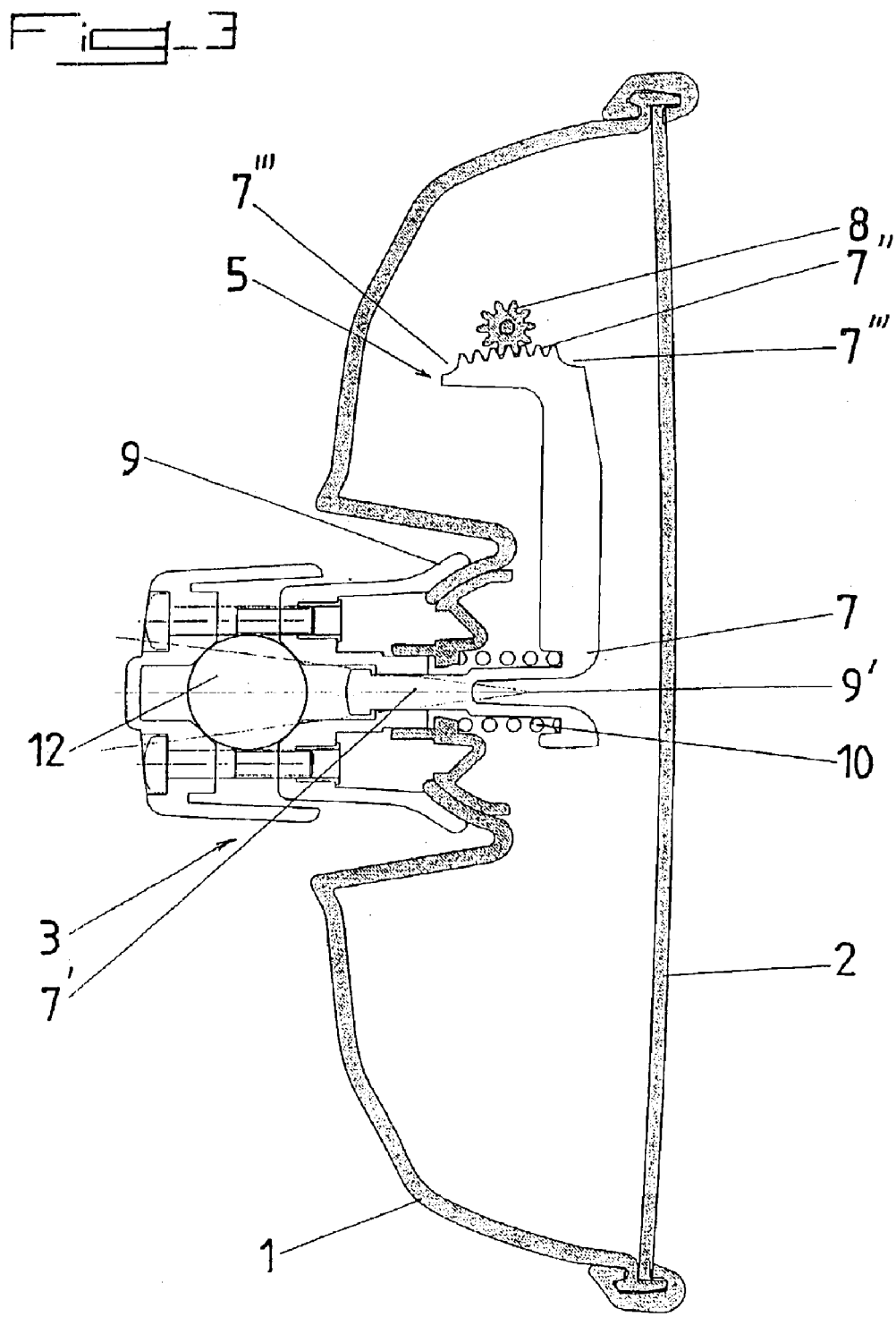

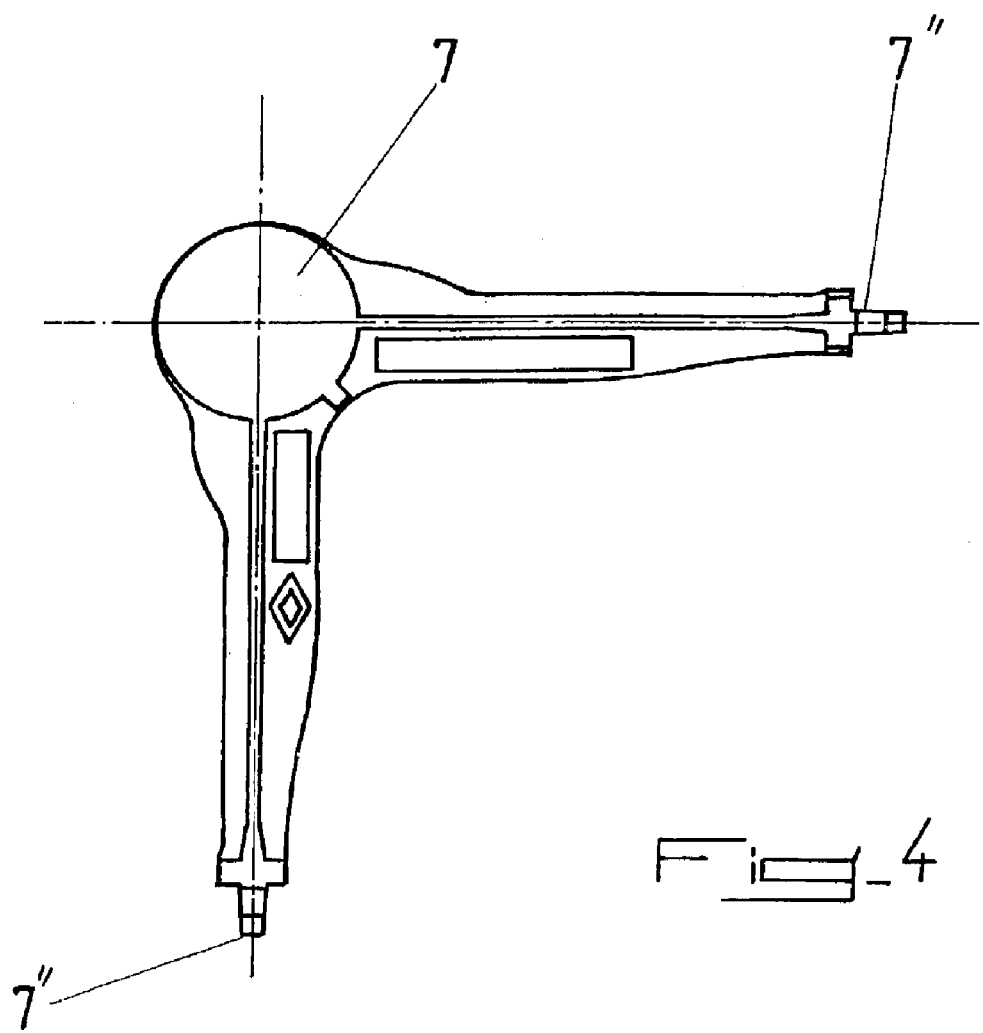

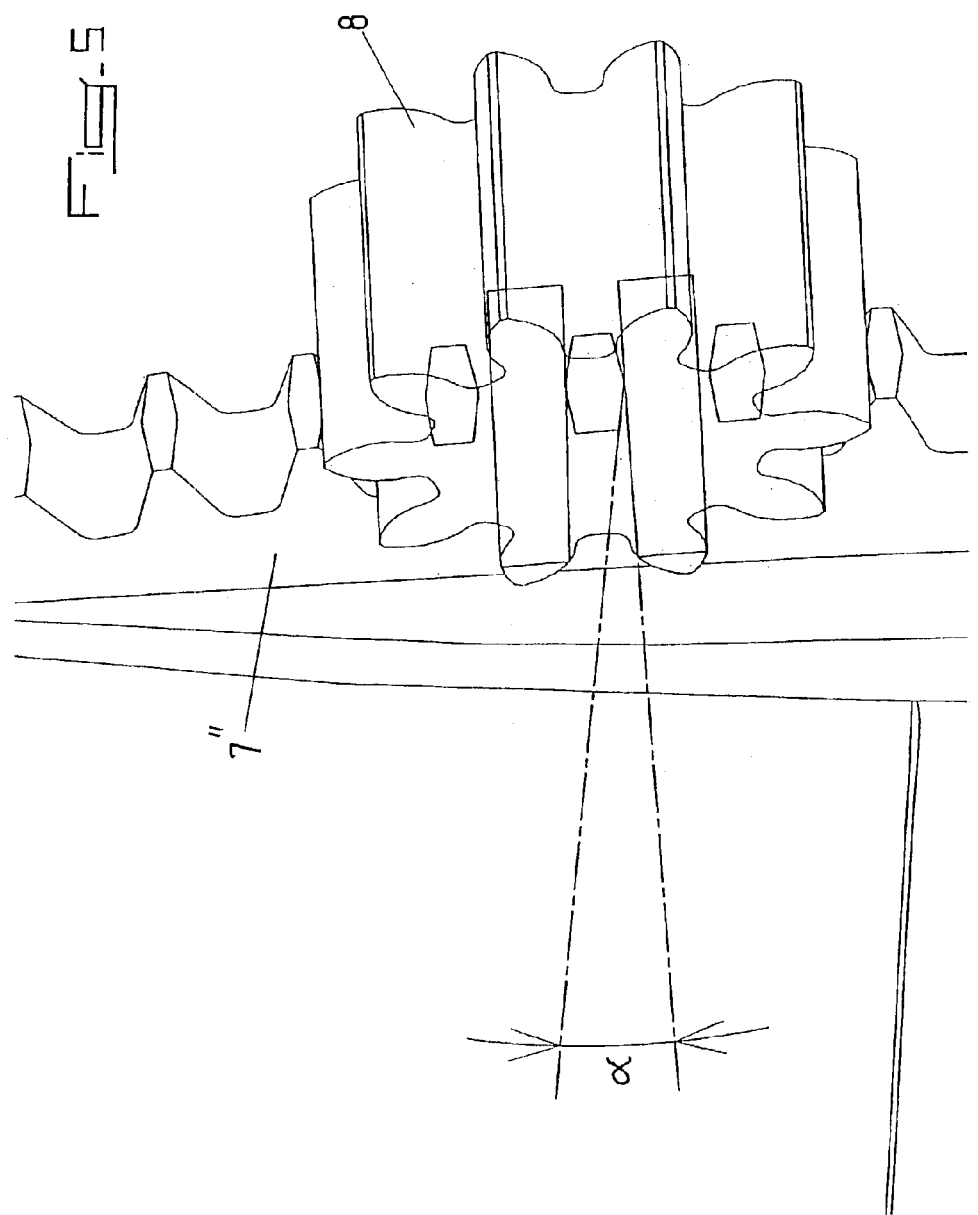

OUTSIDE REARVIEW MIRROR FOR AN AUTOMOTIVE VEHICLE

BACKGROUND OF THE INVENTION

The present invention relates to the field of production of accessories for the automotive industry, in particular rearview mirrors, particularly external rearview mirrors for utility vehicles and more particularly for agricultural tractors, and has for its object such an external rearview mirror provided with means for adjusting the housing.

DESCRIPTION OF THE RELATED ART

Automotive vehicles are generally provided with two external rearview mirrors each fixed on a front door or on a portion of the front body. These rearview mirrors are most often constituted by an assembly for securement on the door or an element of the body and by a housing mounted pivotably on said assembly.

At present, rearview mirrors for utility vehicles and for agricultural tractors are generally constituted by a housing for supporting and receiving the rearview mirror and by means for mounting this housing on a door or on an element of the body. The mirror being of a relatively great size and weight, said mirror is mounted fixedly in the housing, this latter being, for its part, connected adjustably to the door or the body by means of a rotary bearing device.

The adjustment of the position of the housing with the mirror is carried out manually or by means of a power-driven assembly comprising two specific motors each causing a pivotal adjustment of the housing by means of specially adapted adjustment fingers or else by means of at least one motorized connecting rod-crank assembly, whose motor is a stepping motor (EP0 342 412).

The known motorized adjustment means of course permit solving the problem of remotely adjusting a large rearview mirror housing, making it unnecessary for the driver to carry out a careful manual adjustment and taking account to the maximum of his optimum driving position.

However, these known means have the drawback of using complicated devices that are accordingly costly, which result in seriously increasing the cost of rearview mirrors that are thus equipped.

SUMMARY OF THE INVENTION

The present invention has for its object to overcome these drawbacks, by providing an external rearview mirror that can be easily remotely manipulated and that of relatively low cost to produce.

To this end, the external rearview mirror of an automotive vehicle, in particular a utility vehicle and more particularly agricultural tractors, which comprises a housing for supporting and receiving a rearview mirror, a mounting assembly for said housing on a door or on a body element and adjustment means for the housing by means of at least one electric motor, is characterized in that the adjustment means for the housing is essentially constituted by a driver secured to the housing and by a pair of drive motors coacting with said driver each directly by means of a drive pinion.

BRIEF DESCRIPTION OF THE DRAWINGS

The invention will be better understood from the following description, which relates to a preferred embodiment, given by way of non-limiting example, and explained with reference to the accompanying schematic drawings, in which:

FIG. 2 is a perspective view of the rearview mirror according to FIG. 1;

FIG. 3 is a side elevational and cross-sectional view of the rearview mirror housing alone;

FIG. 4 is a plan view of the drive, and

FIG. 5 is an enlarged perspective view showing the engagement of a drive motor pinion with the driver.

DESCRIPTION OF THE PREFERRED EMBODIMENTS

Figure 1:
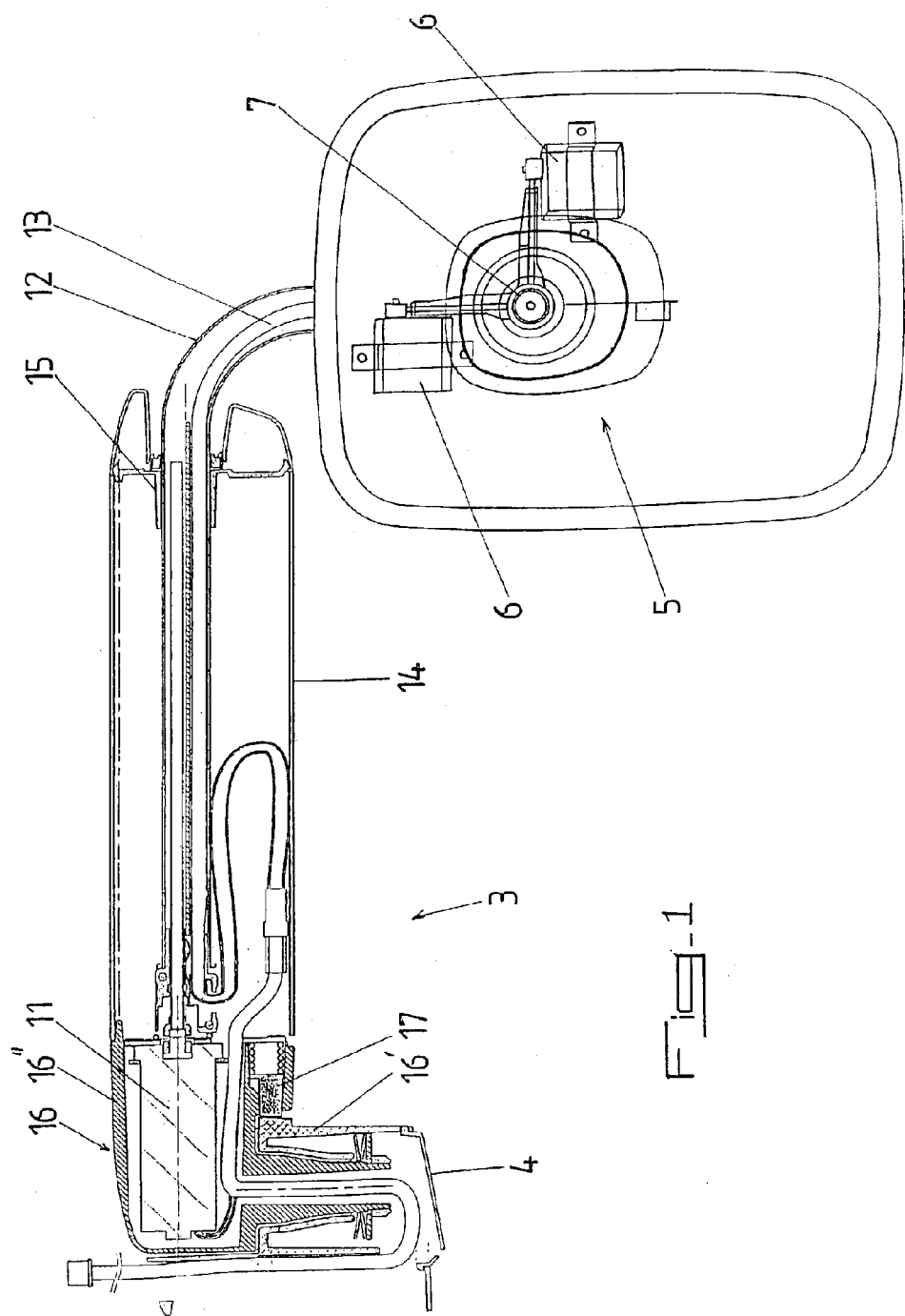
FIG. 1 is a front elevational and cross-sectional view of a rearview mirror according to the invention.

FIGS. 1 and 2 of the accompanying drawings show an external rearview mirror of an automotive vehicle, in particular a utility vehicle and more particularly agricultural tractors, which comprises a housing 1 for supporting and receiving a rearview mirror 2, a mounting assembly 3 for said housing 1 on a door 4 or on a body element and adjustment means 5 for the housing 1 by means of at least one electric motor 6. Such an external rearview mirror is generally mounted projecting and spaced from the body of the vehicle by means of the mounting assembly 3.

According to the invention, the adjustment means 5 for the housing 1 is essentially constituted by a drive 7 secured to the mounting assembly 3 of the housing 1 and by a pair of drive motors 6 coacting with said drive 7, each directly by means of a drive pinion 8 (FIGS. 1 and 3 to 5). Thus, actuation of the drive 7 by one or the other of the drive motors 6 will have the effect of causing relative displacement between the housing 1 and its mounting assembly 3 on a door 4 or on a body element and, as a result, permitting an adjustment of its inclination relative to a vertical axis and a horizontal axis.

The drive 7 is preferably fixed to a rotary bearing 9 which is a constituent of the mounting assembly 3 of the housing 1 and is present in the form of two arms disposed with angular offset, these arms being connected substantially at a right angle to an axle 7' for connection with the rotary bearing 9 constituting the assembly 3 and being each provided at its free end with a rack 7" adapted to coact with the drive pinion 8 of the corresponding motor 6. Each rack 7" extends substantially in the plane passing through the support arm and through the axle 7', which coincides with the axis of the rotor bearing 9 and has a curvature whose center coincides with that 9' of the rotary bearing 9 that constitutes the assembly 3 (FIG. 3).

Preferably, the drive 7 is connected to the rotary bearing 9 shape-matingly, preferably by ensleeving in the external element of said rotary bearing 9 and bears on the internal portion of the rotary bearing 9 coacting with the housing 1 by means of a compression spring 10. Thus, the assembly of rotary bearing 9 on the housing 1 is finally carried out during emplacement and gripping of the drive 7.

The constituent arms of the drive 7 are perfectly identical. However, these arms can also be of different shapes and lengths. Such an embodiment of arms of different shapes and lengths can be particularly interesting in the case of the production of a housing 1 having principal dimensions, namely very different width and height, such that the arrangement of the drive motor 6 can be carried out in an optimum manner.

According to another characteristic of the invention and as shown more particularly in FIG. 5 of the accompanying drawings, the teeth of the rack 7" provided at the ends of the drive arms 7 are preferably transversely protuberant at their vertical cross-section. It is also possible, according to a modified embodiment of the invention not shown in the accompanying drawings, to make the teeth of the racks 7" provided at the ends of the drive arms 7 with flat portions disposed in a broken line. Such an embodiment of the teeth of the racks 7' permits engagement of these latter with the teeth of the pinions 8 of the drive motors 6, in all adjusted positions of the housing 1. Thus, during adjustment of the position of the housing 1, this latter carries out a movement relative to the rotary bearing 9 of the support assembly 3, this also substantially relative to a vertical axis and relative to a horizontal axis. This pivoting thus takes place also relative to the drive 7, which remains fixed relative to the housing 1, which is moved on the rotary bearing 9. It follows that the relative position of the axis of each drive motor 6 and hence of the corresponding pinion 8, relative to the corresponding rack 7', is modified and that the engagement between the teeth of the pinions 8 and the racks 7' takes place at a variable angle relative to the transverse axis of the teeth, at an angle α, as shown in FIG. 5 of the accompanying drawings.

According to another characteristic of the invention and as shown more particularly in FIG. 3 of the accompanying drawings, the ends of the racks are each provided with a recess 7''' whose radius of curvature corresponds to that of the drive pinion 8 of the drive motor 6. Such a recess permits reception of the drive pinion 8, at the end of the path of pivoting and a friction of said pinion 8 in the recess 7'''. As a result, at the end of the path, the pinion 8 has friction within the recess 7''' and, during reversal of the drive motor 6, the pinion 8 reengages automatically with the rack 7'. Moreover, this embodiment of the racks 7' permits the use of simple drive motors, of low cost of construction, which is to say motors not requiring specific safety means and functioning automatically at the end of the path to avoid their destruction following an overload. Similarly, costly end of path contacts can also he omitted.

To promote the friction of the pinion 8 at the end of the path in the recesses 7''', as well as to permit automatic reengagement during reversal of the direction of drive of the motor 6 after arriving at the end of the path, the drive arms 7 are preferably made of a slightly elastically deformable material. This slight elastic deformation permits ensuring perfect operation of the drive of the housing 1 whilst improving the reliability of the positioning means, namely of the drive 7 and the pinions 8 and their drive motor 6, because at the end of path positions, there exists no risk of retaining in engagement which might give rise to the destruction of one or the other moving member.

The housing 1 can of course be mounted directly on a fixed element of the body, by means of the rotary bearing 9. However, as shown in FIGS. 1 and 2 of the accompanying drawings, the housing 1 can also be mounted on an element of the body or on a vehicle door by means of a mounting assembly 3 of said housing 1 movable by pivoting relative to the vehicle. To this end, the mounting assembly 3 can preferably have the form of a telescopic device having an actuating jack 11 coacting with a hollow support arm 12 connected to the rotary bearing 9 (FIG. 3), this support arm 12 partially receiving a bundle 13 of electrical supply cables for the drive motors 6, the actuating jack 11 and the hollow support 12 being disposed and guided in a sleeve 14 provided at one end of a guide bearing 15 of the arm 12 and connected at its other end to a pivoting bearing 16 coacting with an element of the body or with the door 4.

Preferably, the sleeve 14 is made of an extruded or spun profiled element. Such an embodiment of the sleeve 14 permits an extremely simplified production and easy adaptation to the necessary length of sleeve by simple cutting off. It results that the sleeve 14 can be made at an extremely low cost, whilst permitting obtaining a good-looking element 3.

The pivoting bearing 16, which is essentially comprised by a support portion 16' secured to a body element or door 4 and by a portion 16" coacting with the sleeve 14 and receiving the jack 11, is provided with at least one means 17 for indexing an abutment at the end of path positions, for example in the form of a slide loaded by a spring coacting at its opposite end to the support with positioning notches provided on the support portion 16'. Such an indexing device permits universal use of the pivoting bearing 16, both for right mounting and for left mounting on the vehicle, the positioning of the housing 1 being adapted simply to be modified by inversion of its mounting on the corresponding end of the hollow arm 12.

Thanks to the invention, it is possible to provide an external rearview mirror for an automotive vehicle, in particular for utility or agricultural vehicles, that can be adjusted from the interior of the vehicle by means of electrical control and whose adjustment means is of a particularly simple construction. Moreover, the rearview mirror according to the invention has the reliability of operation which is increased relative to the known rearview mirror.

Finally, the rearview mirror according to the present invention can be produced at relatively low cost, with optimization of the different means of use, in particular drive motors for pivoting the housing 1, as well as constituent elements of the mounting assembly 3 of the housing 1.

Of course, the invention is not limited to the embodiment described and shown in the accompanying drawings. Modifications remain possible, particularly as to the construction of the various elements or by substitution of technical equivalents, without thereby departing from the scope of protection of the invention.

What is claimed is:

1. Exterior rearview mirror of an automotive vehicle, comprising an outermost housing (1) for supporting and receiving a rearview mirror (2) mounted fixedly in said housing (1), a mounting assembly (3) for said housing (1) on a door (4) or on a body element and adjustment means (5) for the housing by means of at least one electrical motor, characterized in that the adjustment means (5) of the housing is constituted by a drive (7) secured to the housing (1) and by a pair of drive motors (6) coacting with said drive (7) each directly by means of a drive pinion (8).

2. Rearview mirror according to claim 1, characterized in that the drive (7) is secured to a rotary bearing (9) which constitutes the assembly (13) for mounting the housing (1) and is present in the form of two arms disposed with angular offset, these arms being connected substantially at a right angle to a connection axle (7') with a rotary bearing (9) that constitutes the assembly (3) and being each provided at its free end with a rack (7") adapted to coact with the drive pinion (8) of the corresponding motor (6).

3. Rearview mirror according to claim 2, characterized in that each rack (7") extends substantially in the plane passing through the support arm and through the axle (7'), which coincides with the axis of the rotary bearing (9) and has a curvature whose center coincides with that (9') of the rotary bearing (9) constituting the assembly (3).

4. Rearview mirror according to claim 2, characterized in that the drive (7) is connected to the rotary bearing (9) shape-matingly, preferably by ensleeving in the external element of said rotary bearing (9) and bears on the internal portion of the rotary bearing (9) coacting with the housing (1) by means of a compression spring (10).

5. Rearview mirror according to claim 2, characterized in that the arms constituting the drive (7) are identical.

6. Rearview mirror according to claim 2, characterized in that the arms constituting the drive (7) are of different shapes and lengths.

7. Rearview mirror according to claim 2, characterized in that the rack teeth (7") provided at the ends of the drive arm (7) are transversely protuberant in their upright cross-section.

8. Rearview mirror according to claim 2, characterized in that the rack teeth (7") provided at the ends of the drive arms (7) are constituted by flat portions disposed in a broken line.

9. Rearview mirror according to claim 2, characterized in that the ends of the racks are each provided with a recess (7''') whose radius of curvature corresponds to that of the drive pinion (8) of the drive motor (6).

10. Rearview mirror according to claim 2, characterized in that the drive arms (7) are made of a slightly resiliently deformable material.

11. Rearview mirror according to claim 1, characterized in that the mounting assembly (3) is in the form of a telescopic device having an actuating jack (11) coacting with a hollow support arm (12) connected to the rotary bearing (9), this support arm (12) partially receiving a bundle (13) of electrical supply cables for the drive motors (6), the actuating jack (11) and the hollow support arm (12) being disposed and guided in a sleeve (14) provided at one end of a bearing (15) for guiding the arm (12) and connected at its other end to a pivoting bearing (16) coacting with a body element or door (4).

12. Rearview mirror according to claim 11, characterized in that the sleeve (14) is in the form of an extruded or spun profile.

13. Rearview mirror according to claim 11, characterized in that the pivoting bearing (16), which is provided by a support portion (16') secured to a body element or a door (4) and by a portion (16") coacting with the sleeve (14) and receiving the jack (11), is provided with at least one indexing and abutment means (17) in the end of path position, for example in the form of a slide loaded by a spring coacting with its opposite end to the spring with positioning notches provided on the support portion (16').

14. Exterior vehicle rearview mirror, comprising:

an outermost housing (1);

a rearview mirror (2) mounted fixedly in said housing (1);

a mounting assembly (3) for attaching said housing (1) on a vehicle exterior surface; and a housing position adjustment means (5) located at least partial within an interior volume defined by said housing and mirror, the housing position adjustment means comprising a drive (7) secured to the housing and a pair of electric drive motors (6) coacting with said drive (7) via a drive pinion (8), and wherein operation of each electric drive motor, via drive pinion and drive, repositions the housing.

15. Mirror of claim 14, wherein, the drive (7) is secured to a rotary bearing (9) which constitutes the mounting assembly (3) and is present in the form of two arms disposed with angular offset, these arms being connected substantially at a right angle to a connection axle (7') with a rotary bearing (9) that constitutes the mounting assembly (3), each provided at its free end with a rack (7") adapted to coact with the drive pinion (8) of the corresponding motor (6).

16. Mirror of claim 14, wherein, the mounting assembly (3) is in the form of a telescopic device having an electric actuating jack (11) coacting with a hollow support arm (12) connected to the rotary bearing (9), this support arm (12) partially receiving a bundle (13) of electrical supply cables for the drive motors (6), the actuating jack (11) and the hollow support arm (12) being disposed and guided in a sleeve (14) provided at one end of a bearing (15) for guiding the arm (12) and connected at its other end to a pivoting bearing (16) coacting with a body element or door (4).

* * * * *